(12) United States Patent
Panzner et al.

(10) Patent No.: US 12,451,925 B2
(45) Date of Patent: Oct. 21, 2025

(54) RECEPTION OF CHIRP SIGNALS

(71) Applicant: Nokia Technologies Oy, Espoo (FI)

(72) Inventors: Berthold Panzner, Holzkirchen (DE); Wolfgang Zirwas, Munich (DE)

(73) Assignee: Nokia Technologies Oy, Espoo (FI)

( * ) Notice: Subject to any disclaimer, the term of this patent is extended or adjusted under 35 U.S.C. 154(b) by 161 days.

(21) Appl. No.: 18/271,502

(22) PCT Filed: Dec. 23, 2021

(86) PCT No.: PCT/EP2021/087493
§ 371 (c)(1),
(2) Date: Jul. 10, 2023

(87) PCT Pub. No.: WO2022/152544
PCT Pub. Date: Jul. 21, 2022

(65) Prior Publication Data
US 2024/0097737 A1    Mar. 21, 2024

(30) Foreign Application Priority Data
Jan. 13, 2021   (FI) .................................... 2021503

(51) Int. Cl.
*H04B 1/69*   (2011.01)
(52) U.S. Cl.
CPC ....... *H04B 1/69* (2013.01); *H04B 2001/6912* (2013.01)

(58) Field of Classification Search
CPC ..................... H04B 1/69; H04B 2001/6912
See application file for complete search history.

(56) References Cited

U.S. PATENT DOCUMENTS 10,840,969 B1 *  11/2020  Barnawi ............... H04B 1/04

FOREIGN PATENT DOCUMENTS

WO    WO 2019/091558 A1    5/2019

OTHER PUBLICATIONS

Wang, Z. et al. "Online Concurrent Transmission at LoRa Gateway," IEEE Infocom 2020, IEEE Conference on Computer Communications, Jul. 6, 2020, pp. 2331-2340.
Hou, Y. et al., "A Novel MAC Protocol Exploiting Concurrent Transmission for Massive LoRa Connectivity," Journal of Communications and Networks, vol. 22, No. 2, Apr. 2020, pp. 108-117.

* cited by examiner

*Primary Examiner* — Betsy Deppe
(74) *Attorney, Agent, or Firm* — McCarter & English LLP

(57) ABSTRACT

Various example embodiments relate to reception of chirp signals. A receiver may receive a signal including at least one chirp spread spectrum waveform. The receiver determines whether the signal includes overlapping chirp waveforms. A decoding method may be selected accordingly. Apparatuses, methods, and computer programs are disclosed.

13 Claims, 7 Drawing Sheets

RECEPTION OF CHIRP SIGNALS

CROSS REFERENCE TO RELATED APPLICATION

This patent application is a U.S. National Stage application of International Patent Application Number PCT/EP2021/087493 filed Dec. 23, 2021, which is hereby incorporated by reference in its entirety, and claims priority to FI 20215031 filed Jan. 13, 2021.

TECHNICAL FIELD

Various example embodiments generally relate to the field of wireless communications. In particular, some example embodiments relate to reception of chirp signals.

BACKGROUND

In various communication systems, chirped spread spectrum waveforms may be used to transmit data between devices. A chirped spread spectrum waveform may be characterized by its spreading factor, which may be dependent on the chirp rate and the symbol rate. In order to enable simultaneous reception of multiple signals, the chirped spread spectrum waveforms may be designed such that they are mutually orthogonal.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide methods for discriminating overlapping chirp spread spectrum waveforms. This benefit may be achieved by the features of the independent claims. Further implementation forms are provided in the dependent claims, the description, and the drawings.

According to a first aspect, an apparatus may comprise means for receiving a signal, wherein the signal comprises at least one chirp spread spectrum waveform; means for determining whether the signal comprises overlapping chirp spread spectrum waveforms with same spreading factor and same bandwidth; means for selecting a decoding method based on whether the signal comprises overlapping chirp spread spectrum waveforms with same spreading factor and same bandwidth; and means for decoding the signal based on the selected decoding method.

According to an example embodiment of the first aspect, the apparatus may further comprise means for filtering the signal with an oversampled matched filter; and means for determining whether the signal comprises overlapping chirp spread spectrum waveforms with same spreading factor and same bandwidth based on a number of peaks in a fast Fourier transform of the output of the matched filter.

According to an example embodiment of the first aspect, the apparatus may further comprise means for synchronizing to a first chirp spread spectrum waveform of the signal; means for oversampling the signal at a oversampling rate $R_{SS}$, wherein $R_{SS} \geq 2R_c$, wherein $R_c$ is a chirp rate of the at least one chirp spread spectrum waveform; means for discriminating a plurality of chirp spread spectrum waveforms from the signal based on filtering the oversampled signal with the matched filter with different sub-sample shifts of the oversampled signal; means for mapping outputs of the matched filter corresponding to the different sub-sample shifts of the oversampled signal to a plurality of transmitters; means for determining data values associated with the plurality of transmitters based on the outputs of the oversampled matched filter corresponding to the different sub-sample shifts; and means for outputting the data values associated with the plurality of transmitters.

According to an example embodiment of the first aspect, the apparatus may further comprise means for calculating, for at least two of the plurality of chirp spread spectrum waveforms, at least one of: a peak sample power within a window of samples of the output of the matched filter, a power of the window of samples, a ratio between the peak sample power and the power of the window of samples; and means for mapping the plurality of peaks of the output of the matched filter to the plurality of transmitters based on comparison of at least one of the peak sample power, the power of the window of samples, or the ratio between the peak sample power and the power of the window of samples, to stored reference data associated with the plurality of transmitters.

According to an example embodiment of the first aspect, the apparatus may further comprise means for determining amplitudes of a plurality of peaks in a fast Fourier transform of the output of the matched filter, and/or means for determining, for at least two of the plurality of peaks, a sum of a power of a plurality of samples within a predetermined distance from a respective peak; and means for mapping the plurality of chirp spread spectrum waveforms to the plurality of transmitters further based on comparison of the amplitudes of the plurality of peaks or the sums the plurality of samples around the respective peaks to the stored reference data associated with the plurality of transmitters.

According to an example embodiment of the first aspect, the apparatus may further comprise means for discriminating the plurality of chirp spread spectrum waveforms from the signal further based on an angle of arrival; and means for mapping the plurality of chirp spread spectrum waveforms to the plurality of transmitters further based on comparison of the angle of arrival to the stored reference data associated with the plurality of transmitters.

According to an example embodiment of the first aspect, the means may comprise at least one processor; and at least one memory including computer program code, the at least one memory and computer program code configured to, with the at least one processor, cause the performance of the apparatus.

According to a second aspect, a method may comprise receiving a signal, wherein the signal comprises at least one chirp spread spectrum waveform; determining whether the signal comprises overlapping chirp spread spectrum waveforms with same spreading factor and same bandwidth; selecting a decoding method based on whether the signal comprises overlapping chirp spread spectrum waveforms with same spreading factor and same bandwidth; and decoding the signal based on the selected decoding method.

According to an example embodiment of the second aspect, the method may further comprise filtering the signal with an oversampled matched filter; and determining whether the signal comprises overlapping chirp spread spectrum waveforms with same spreading factor and same bandwidth based on a number of peaks in a fast Fourier transform of the output of the matched filter.

According to an example embodiment of the second aspect, the method may further comprise synchronizing to a first chirp spread spectrum waveform of the signal; oversampling the signal at a sampling rate $R_{SS}$, wherein $R_{SS} \geq 2R_c$, wherein $R_c$ is a chirp rate of the at least one chirp spread spectrum waveform; discriminating a plurality of chirp spread spectrum waveforms from the receive signal based on filtering the oversampled receive signal with the matched filter with different sub-sample shifts; mapping outputs of the matched filter corresponding to the different sub-sample shifts of the oversampled receive signal to a plurality of transmitters; determining data values associated with the plurality of transmitters based on the outputs of the matched filter corresponding to the different sub-sample shifts; and outputting the data values associated with the plurality of transmitters.

According to an example embodiment of the second aspect, the method may further comprise calculating, for at least two of the plurality of chirp spread spectrum waveforms, at least one of: a peak sample power within a window of samples of the output of the matched filter, a power of the window of samples, a ratio between the peak sample power and the power of the window of samples; and mapping the plurality of peaks of the output of the matched filter to the plurality of transmitters based on comparison of at least one of the peak sample power, the power of the window of samples, or the ratio between the peak sample power and the power of the window of samples, to stored reference data associated with the plurality of transmitters.

According to an example embodiment of the second aspect, the method may further comprise determining amplitudes of a plurality of peaks in a fast Fourier transform of the output of the matched filter, and/or determining, for at least two of the plurality of peaks, a sum of a power of a plurality of samples within a predetermined distance from a respective peak; and mapping the plurality of chirp spread spectrum waveforms to the plurality of transmitters further based on comparison of the amplitudes of the plurality of peaks or the sums the plurality of samples around the respective peaks to the stored reference data associated with the plurality of transmitters.

According to an example embodiment of the second aspect, the method may further comprise discriminating the plurality of chirp spread spectrum waveforms from the signal further based on an estimated angle of arrival; and mapping the plurality of chirp spread spectrum waveforms to the plurality of transmitters further based on comparison of the estimated angle of arrival to the stored reference data associated with the plurality of transmitters.

According to a third aspect, a computer program may comprise instructions for causing an apparatus to perform at least the following: receiving a signal, wherein the signal comprises at least one chirp spread spectrum waveform; determining whether the signal comprises overlapping chirp spread spectrum waveforms with same spreading factor and same bandwidth; selecting a decoding method based on whether the signal comprises overlapping chirp spread spectrum waveforms with same spreading factor and same bandwidth; and decoding the signal based on the selected decoding method. The computer program may further comprise instructions for causing the apparatus to perform any example embodiment of the method of the second aspect.

According to a fourth aspect, an apparatus may comprise at least one processor and at least one memory including computer program code, the at least one memory and the computer code configured to, with the at least one processor, cause the apparatus at least to: receive a signal, wherein the signal comprises at least one chirp spread spectrum waveform; determine whether the signal comprises overlapping chirp spread spectrum waveforms with same spreading factor and same bandwidth; select a decoding method based on whether the signal comprises overlapping chirp spread spectrum waveforms with same spreading factor and same bandwidth; and decode the signal based on the selected decoding method. The at least one memory and the computer code may be further configured to cause the apparatus perform any example embodiment of the method of the second aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Communication systems such as for example internet-of-things (IoT) sensor networks may apply a contention-based random access scheme, where transmissions from different sensors are not coordinated and therefore transmissions may be randomly distributed over time. Some networks may be based on chirped spread spectrum (CSS) technology, which may use frequency modulated chirp pulses to spread encoded information over a wide frequency band. The chirp pulses may be designed such that they are mutually orthogonal. It is however possible that different sensors transmit with same spreading factor such that the transmissions from the different sensors partially or fully overlap in time and frequency. Example embodiments of the present disclosure enable reception and decoding of overlapping chirp waveforms having the same spreading factor, or more generally reception and decoding of overlapping chirp waveforms.

Figure 1:
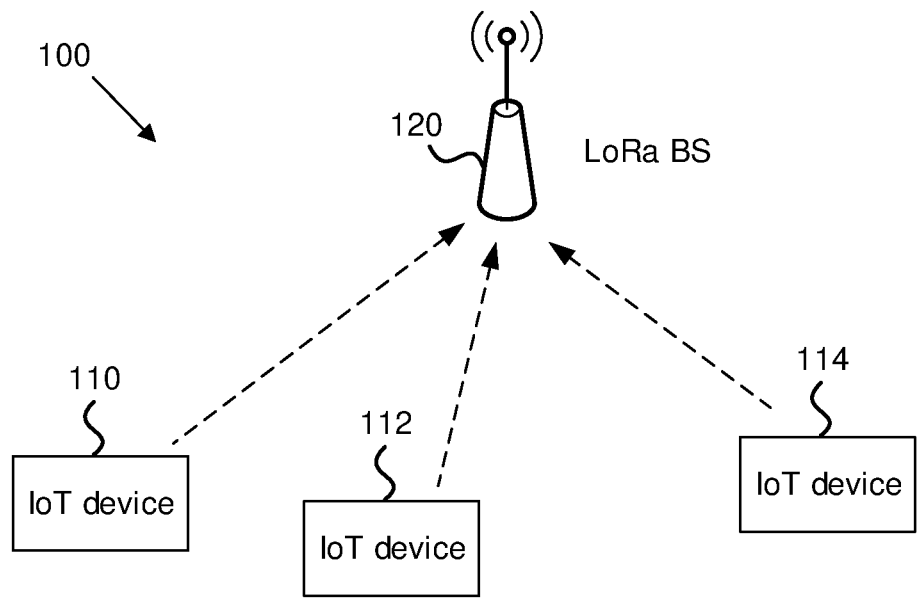
FIG. 1 illustrates an example of a communication network, according to an example embodiment.

FIG. 1 illustrates an example of a communication network, according to an example embodiment. Communication network 100 may comprise one or more internet-of-things (IoT) devices 110, 112, 114, for example sensors, generally provided as examples of transmitters. The IoT devices 110, 112, 114 may communicate with a base station (BS) 120, which is generally provided as an example of a receiver. The base station 120 may be also referred to as a gateway (GW). It is however possible that one of the IoT devices 110, 112, 114 operates as a gateway to the other IoT devices.

The communication network 100 may be configured for example according to a LoRaWAN system, which provides an IoT connectivity solution in the unlicensed ISM (industrial, scientific, and medical) band. A LoRaWAN system may use chirped spread spectrum waveforms to transmit payload data from multiple IoT sensors to a LoRa GW. A LoRa waveform may be therefore characterized by its spreading factor (SF), which may range for example from 7 to 12 with $$SF = \log_2 \frac{R_c}{R_S},$$

where $R_c$ is the chirp rate (e.g. 125 kcps) and $R_S$ is the symbol rate. Relations between the symbol rate $R_S$, chirp rate $R_c$, and bandwidth BW, may be provided as follows: $R_S=BW/2^{SF}$, $R_c=BW*R_S$, and $R_c=BW*(BW/2^{SF})$.

Figure 2:
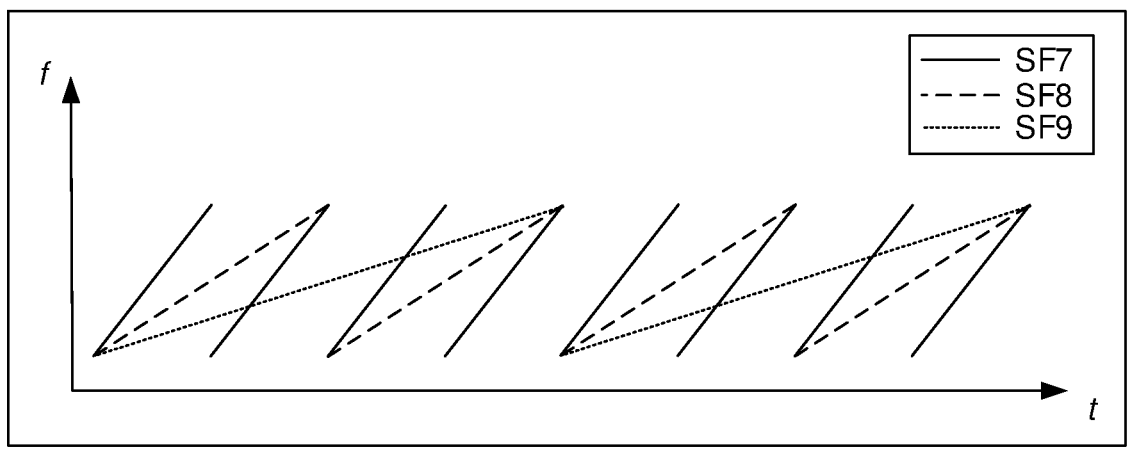
FIG. 2 illustrates an example of orthogonal chirp waveforms with different spreading factors, according to an example embodiment.

A LoRaWAN (wide area network) may be based on six different spreading factors ranging from SF7 to SF12, where 2SF equals the number of chirps per second. For example, SF=12 corresponds to 4096 chirps per second. Hence LoRa waveforms with different spreading factors and the same bandwidth may be orthogonal. Orthogonality of LoRa waveforms with the same bandwidth (e.g. 125 kHz) but different spreading factors (SF7, SF8, SF9 is illustrated in FIG. 2, which shows the frequency (f) of each waveform with respect to time (t). For example, the chirp of SF8 may sweep through the frequency range twice as fast as SF9. And, four chirps of SF7 may be transmitted in a time corresponding to one chirp of SF9.

Example embodiments of the present disclosure enable to cope with collisions of multiple LoRa packets transmitted by different IoT devices (e.g. sensors) with identical spreading factor and arriving at the same time (fully or partially overlapping) at a receiver (e.g. a LoRa BS also referred to as LoRa GW). The example embodiments enable the receiver to discriminate between overlapping chirped spread spectrum waveforms in the reception and decoding process.

Both overlapping and non-overlapping chirp waveforms are orthogonal, if they have different spreading factors for the same bandwidth. Chirp waveforms are non-orthogonal, if they have the same spreading factor for the same bandwidth and if they at least partially overlap in time on a given frequency band. Discrimination of non-orthogonal chirp waveforms enables to improve capacity of communication systems such as LoRaWAN by allowing simultaneous reception of non-orthogonal waveforms. It is however noted that the example embodiments may be also applied to reception and decoding of orthogonal chirp waveforms.

According to an example embodiment, a receiver may receive a signal comprising at least one chirp spread spectrum waveform. The receiver may determine whether the signal comprises overlapping chirp waveforms, for example based on an output of a matched filter. A decoding method may be selected accordingly. In case of overlapping chirp waveforms, the receiver may oversample the receive signal and discriminate the non-orthogonal chirp waveforms based on applying different sub-sample shifts to the received signal, when performing the matched filtering. The chirp waveforms may be further discriminated based on angle-of-arrival detection and received signal strength.

Even though some example embodiments have been described using LoRaWAN as an example, it is appreciated that example embodiments may be applied to radio access technologies or networks that are based on any suitable standards, or profiles or variants thereof. For example, in one example embodiment a receiver may be configured to operate according to a wireless local area network standard, specified for example by IEEE 802.11 series or Wi-Fi alliance, or according to a cellular standard, specified for example by 3GPP. The various example embodiments may be therefore applied in any present or future communication networks, for example other type of wide area networks, short-range wireless networks, cellular networks, or the like.

Figure 3:
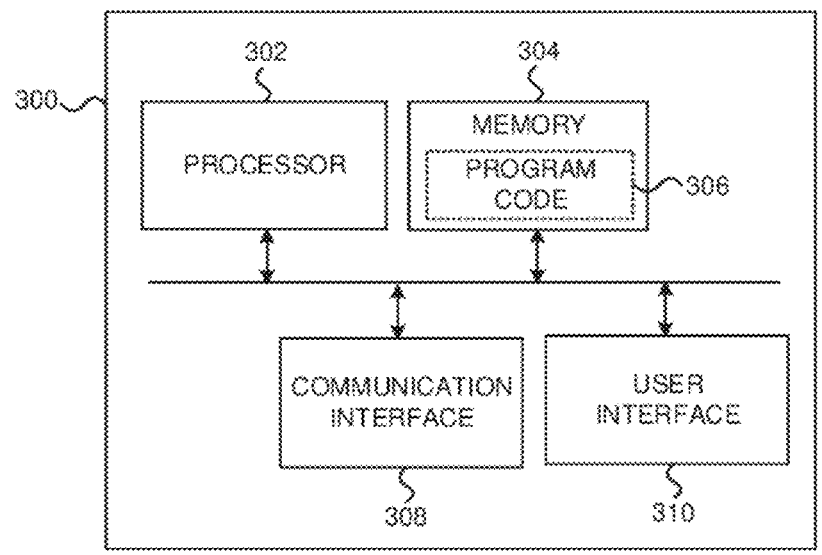
FIG. 3 illustrates an example of an apparatus configured to practice one or more example embodiments.

FIG. 3 illustrates an example embodiment of an apparatus 300, for example a transmitter such as for example an IoT device 110, 112, or 114, or a receiver such as for example base station 120. The apparatus 300 may comprise at least one processor 302. The at least one processor may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 300 may further comprise at least one memory 304. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 300 may further comprise a communication interface 308 configured to enable apparatus 300 to transmit and/or receive information to/from other devices. The communication interface may be configured to provide at least one wireless radio connection, such as for example a LoRaWAN connection. Alternatively, or additionally, the communication interface 308 may be configured to provide one or more other type of connections such as for example a 3GPP mobile broadband connection (e.g. 3G, 4G, 5G), a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 308 may comprise, or be configured to be coupled to, at least one antenna to transmit and/or receive radio frequency (RF) signals. One or more of the various types of connections may be also implemented as separate communication interfaces, which may be coupled or configured to be coupled to one or a plurality of antennas.

The apparatus 300 may further comprise a user interface 310 comprising an input device and/or an output device. The input device may take various forms such a keyboard, a touch screen, or one or more embedded control buttons. The output device may for example comprise a display, a speaker, a vibration motor, or the like.

When the apparatus 300 is configured to implement some functionality, some component and/or components of the apparatus, such as for example the at least one processor and/or the memory, may be configured to implement this functionality. Furthermore, when the at least one processor 302 is configured to implement some functionality, this functionality may be implemented using the program code 306 comprised, for example, in the at least one memory 304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASIC s), application-specific Standard Products (ASSPs), System-on-a-chip systems (SOCs), Complex Programmable Logic Devices (CPLDs), Graphics Processing Units (GPUs).

The apparatus 300 comprises means for performing at least one method described herein. In one example, the means comprises the at least one processor 302, the at least one memory 304 including program code 306 configured to, when executed by the at least one processor, cause the apparatus 300 to perform the method.

The apparatus 300 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, tags, and smart home appliances. In one example, the apparatus 300 may comprise a vehicle such as for example a car. Although apparatus 300 is illustrated as a single device it is appreciated that, wherever applicable, functions of the apparatus 300 may be distributed to a plurality of devices.

Figure 4:
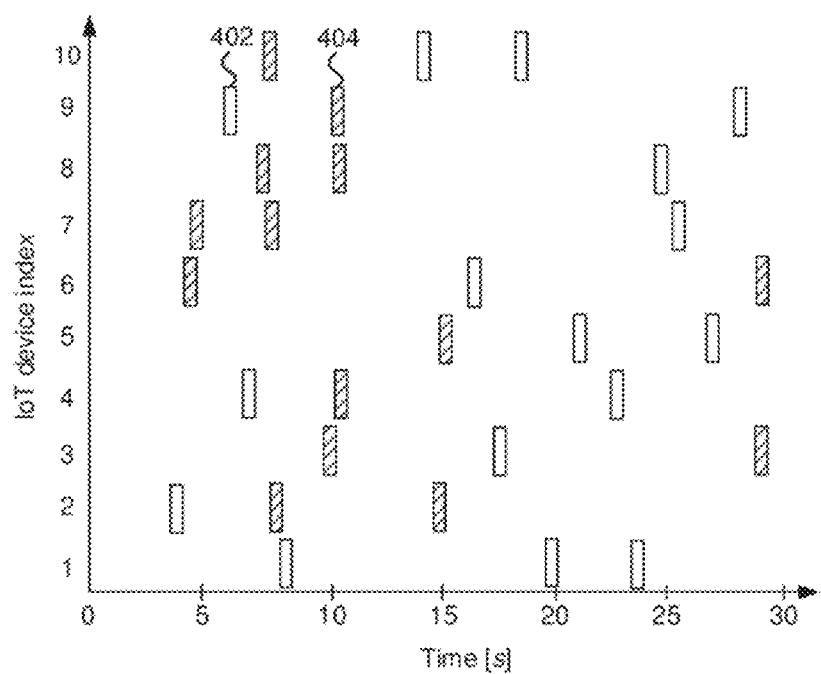
FIG. 4 illustrates an example of arbitrarily distributed transmissions from a group of IoT devices, according to an example embodiment.

FIG. 4 illustrates an example of arbitrarily distributed transmissions from a group of IoT devices, according to an example embodiment. A scenario with ten IoT devices (e.g. sensors), where each IoT device transmits three packets arbitrarily within 30 seconds, is considered in FIG. 4. The IoT devices use the same spreading factor (SF12) with 125 kHz bandwidth. Due to the high traffic generation periodicity there is a high probability that packets collide with each other. Non-colliding packets 402 are illustrated with white color and partially or fully colliding packets 404 are illustrated with diagonal dashes. It is observed that simultaneous transmissions with partial or full overlap of multiple LoRa waveforms with the same spreading factor may occur frequently, which may result in loss of all simultaneously transmitted (i.e. collided) packets.

Figure 5:
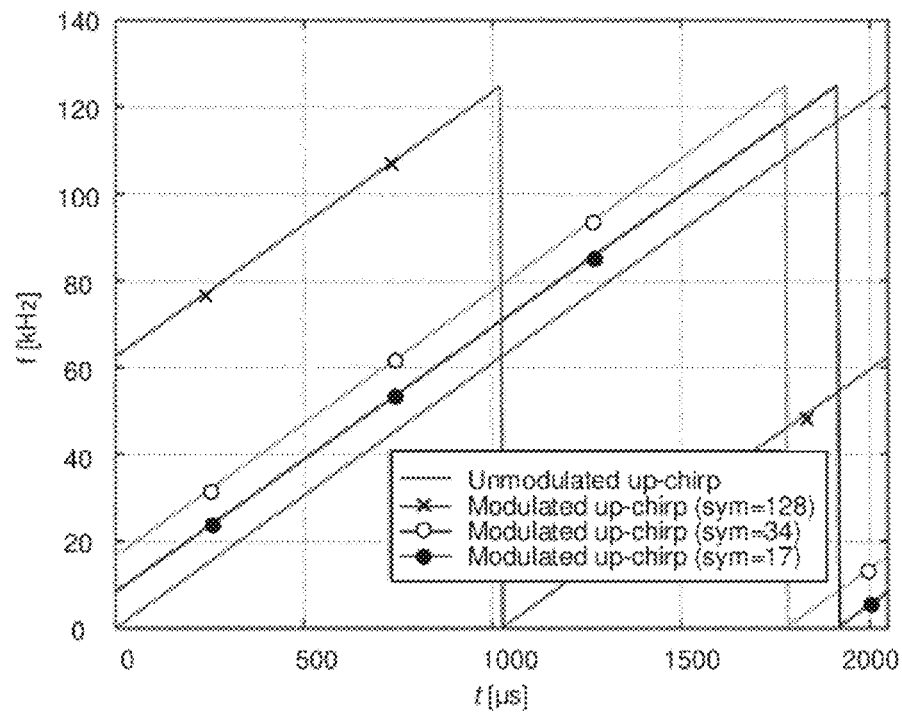
FIG. 5 illustrates an example of three modulated up-chirp waveforms, according to an example embodiment.

FIG. 5 illustrates an example of three modulated up-chirp waveforms, according to an example embodiment. In this example, spreading factor SF8 is used with 125 kHz bandwidth and symbol duration $T_{Sym}$=2048 µs. The spreading factor is reflected in the slope of the frequency curves with respect to time. The frequency of each up-chirp waveform is depicted with respect to time (t). Frequency of an up-chirp signal may increase with respect to time until reaching an upper limit for the chirp frequency and returning to a lower limit of the chirp frequency. Modulated waveforms may start with different initial frequency according to the symbol value.

Figure 6:
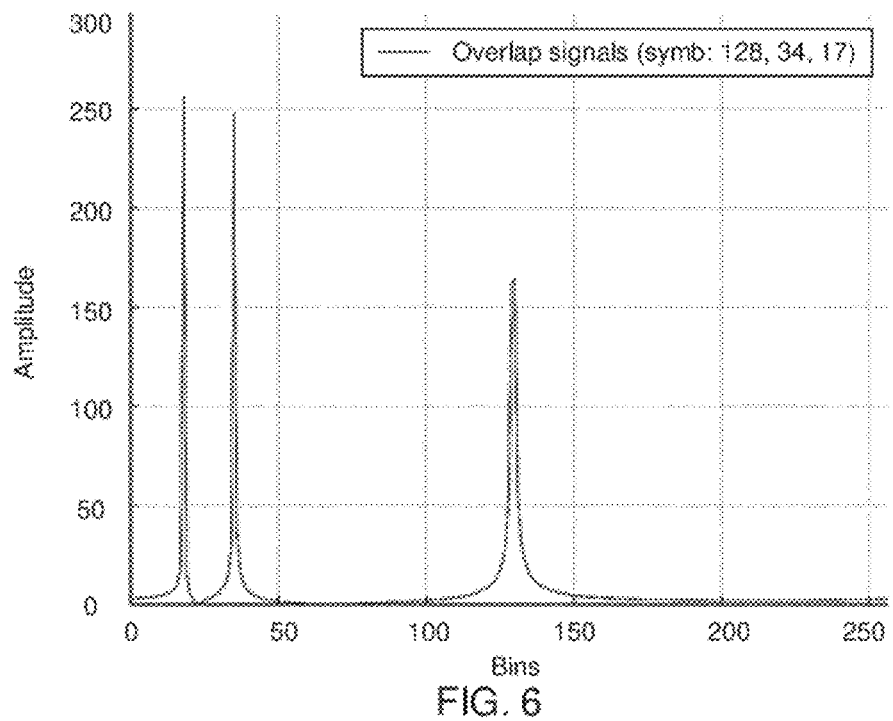
FIG. 6 illustrates an example of a fast Fourier transform (FFT) of three demodulated overlapping up-chirp waveforms, according to an example embodiment.

FIG. 6 illustrates an example of a fast Fourier transform (FFT) of three demodulated overlapping up-chirp waveforms, according to an example embodiment. The process of decoding received LoRa packets at the LoRa GW, or in general any chirped spread spectrum receiver, may be based on a matched filter approach, where the receiver correlates the received waveform with its complex conjugate, which corresponds to an unmodulated downchirp signal.

The FFT of the matched filter output signal reveals the bins, i.e. the digital value of the symbol (values of the symbol ranging from 1 to $2^{SF}$). If several overlapped LoRa waveforms are decoded at once by the LoRa receiver, the FFT results in multiple bins, each peak corresponding to the value of one LoRa waveform. FIG. 6 illustrates the output of the LoRa decoder, when the decoder is provided with the sum-signal of the modulated up-chirp waveforms of FIG. 5 as input. The output of the decoder is illustrated as the FFT of the matched filter. It is observed that the decoded receive sum-signal reveals the three individual transmitted symbols (sym={17, 34, 128}). However, in this example the three LoRa waveforms have been synchronized in time and thus overlapped in time.

As illustrated in FIG. 5, any modulated LoRa waveform may be a cyclical shift of the unmodulated up-chirp, which may comprise a ($2^{SF}$)-FSK (frequency shift keying) staircase waveform. To enable simultaneous non-orthogonal LoRa waveform reception, the following approaches may be considered: synchronization of the LoRa waveforms in time (e.g. synchronization of the start of each symbol of the different waveforms); and mapping of different FFT bins of a sum signal of non-orthogonal chirps to corresponding transmitter devices.

Figure 7:
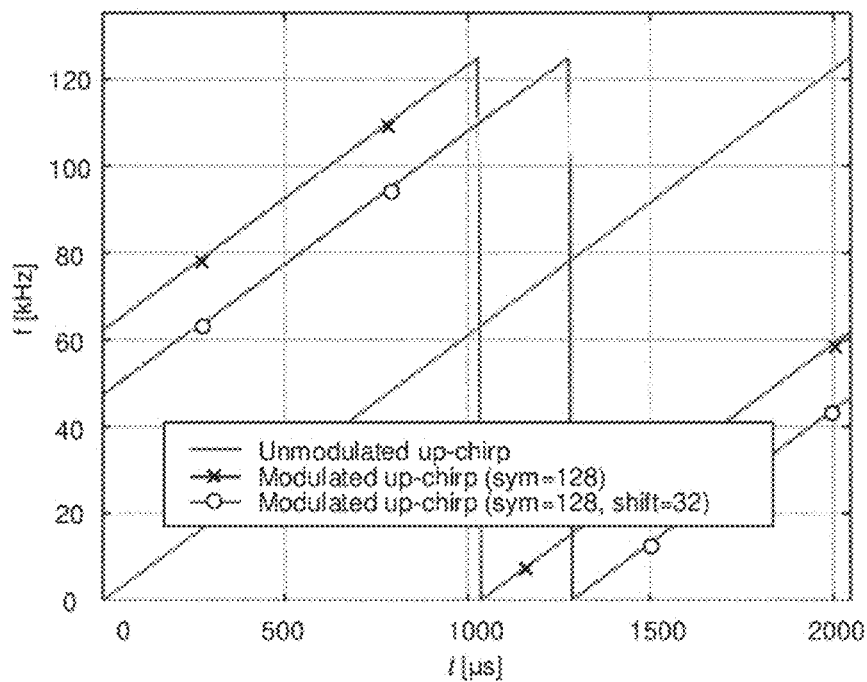
FIG. 7 illustrates an example of two identical modulated up-chirp waveforms transmitted with a time shift, according to an example embodiment.

FIG. 7 illustrates an example of two identical modulated up-chirp waveforms transmitted with a time shift, according to an example embodiment. Also in this example, the spreading factor SF8 is used with 125 kHz bandwidth and symbol duration $T_{Sym}$=2048 µs. Symbol 128 (data value) is transmitted with both modulated up-chirps but one of the two up-chirps is time shifted by 32 samples. One sample may represent 1/BW, for example for SF8@125 kHz the waveform may be 2048 µs long in time domain and one chip (or one sample) may be 8 µs. In total there may be 2^8=256 chips—in other words 256×8 µs=2048 µs. The two signals may be transmitted by two different devices, for example IoT device 110 and IoT device 112. The time-shift may be caused by different start time of transmission, since the two devices may transmit independently from each other, and/or different propagation delay between the devices and the receiver, for example base station 120. Therefore, two unsynchronized LoRa waveforms that are modulated with the same symbol, in the example 128, may be received by a LoRa gateway.

Figure 8:
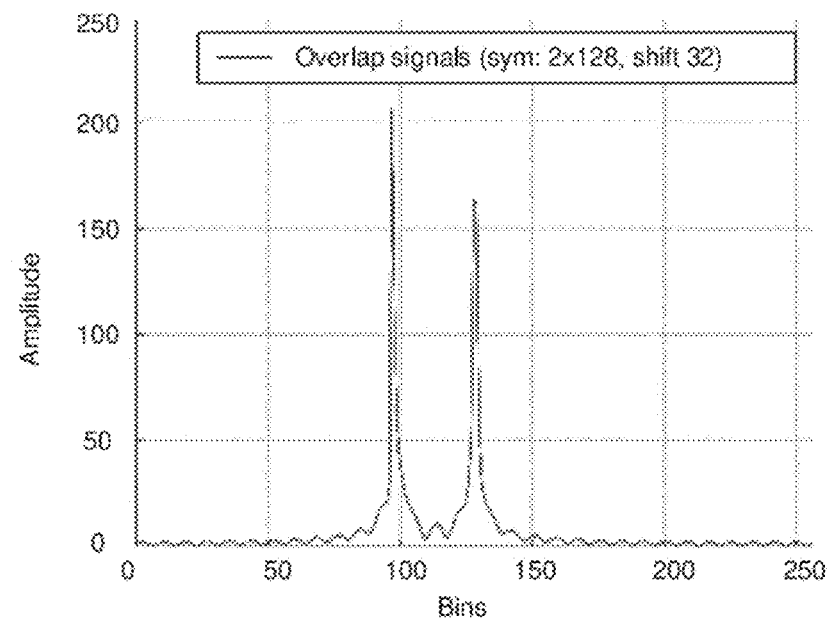
FIG. 8 illustrates an example of a fast Fourier transform (FFT) of two demodulated identical up-chirp waveforms transmitted with a time shift, according to an example embodiment.

FIG. 8 illustrates an example of a fast Fourier transform (FFT) of two demodulated identical up-chirp waveforms transmitted with a time shift, according to an example embodiment. FIG. 8 illustrates the output of the LoRa decoder, when the decoder is provided with the sum-signal of the modulated up-chirp waveforms of FIG. 7 as input. The result of the decoder output shows that the receiver may erroneously misinterpret the time-shifted version with the wrong symbol value. Although both LoRa signals carry the same symbol (sym=128) the LoRa decoder may (mis)interpret the second LoRa signal with the wrong symbol (value=128 minus time shift). In this example, the time shift between the two identical up-chirps is 32. It is noted that increasing the time shift (e.g. to 64) causes the peaks of the FFT output to have larger distance and decreasing the time shift (e.g. to 16) causes the peaks of the FFT output to have smaller distance compared to FIG. 8.

According to an example embodiment, a receiver, for example a LoRa GW, may receive a signal comprising one or a plurality of chirp spread spectrum waveforms. The receiver may comprise a matched filter, which may be configured to correlate a chirp waveform with its complex conjugate. Based on the output of the matched filter, for example an FFT of the output of the matched filter, the receiver may determine whether the signal comprises non-orthogonal chirp waveforms, for example overlapping chirp spread spectrum waveforms with the same spreading factor.

Determining whether non-orthogonal chirp waveforms are included may comprise detecting a number of peaks in the FFT of the output of the matched filter. As illustrated in FIG. 7 and FIG. 8, the number of peaks in the FFT may be indicative of the number of non-orthogonal chirp waveforms included in the received signal. A decoding method may be then selected based on whether the signal comprises non-orthogonal chirp waveforms. This may enable an efficient receiver implementation, where signals not including non-orthogonal chirp waveforms may be processed with less complexity, while signals including non-orthogonal chirp waveforms may be processed with more advanced methods to discriminate the non-orthogonal chirp waveforms. Alternatively, the receiver may be configured to perform any of the more advanced methods for any received signal, for example when the likelihood of receiving non-orthogonal chirp waveforms is high.

If the received signal does not include non-orthogonal chirp waveforms, for example, if the number of peaks in the FFT of the output of the matched filter is one, the receiver may apply any suitable decoding method (e.g. a first decoding method) applicable for orthogonal chirp waveforms. The receiver may for example discriminate possibly overlapping orthogonal chirp waveforms based on their different spreading factors. However, if non-orthogonal chirp waveforms are detected, the receiver may select another decoding method (e.g. a second decoding method). The latter decoding method may be applied for discriminating between the non-orthogonal chirp waveforms for example based on sub-sample shifting of the matched filter applied to the received signal (end-device or user equipment (UE)), angle of arrival detection, or power detection of the received signals, as will be further described below. The received signal may comprise a combined signal or a sum signal comprising multiple waveforms from multiple transmitters, for example IoT devices. Therefore, the shifted matched filter may be applied to the complete sum signal as a whole. The shifting operation, which may comprise sampling the receive sum signal with different time-shifted matched filters, allows to synchronize exactly on the reference/start time of one individual transmitter. The power detection of the received signals may be for example based on (1) sum power over full symbol time, and/or (2) peak amplitude at decoded symbol. This enables discrimination of non-orthogonal chirp waveforms with a very high probability. For example, only in the seldom case that different transmitters have the same azimuthal angles, send non-orthogonal chirp waveforms at exactly integer multiples of $1/R_c$, and the received power from different transmitters is identical at the receiver, the discrimination of the received chirp waveforms may not be possible.

The example embodiments disclosed herein may be implemented for example in a preamble search engine and/or a N×LoRa decoder of a LoRa receiver. The N×LoRa decoder may be configured to decode N LoRa waveforms. The preamble search engine may be for example configured to instruct the N×LoRa decoder to apply independent decoding (cf. a first decoding method) for orthogonal LoRa waveforms. However, the preamble search engine may be configured to instruct the N×LoRa decoder to apply any of the example embodiments to discriminate non-orthogonal LoRa waveforms (cf. second decoding method).

The oversampling, AoA detection, and power detection may be applied in addition, or as an alternative, to detection methods that are based on using the time-frequency pattern of LoRa waveforms in the baseband. A LoRa decoder may be provided with information about the need for discriminating non-orthogonal LoRa waveforms, for example the number of detected non-orthogonal waveforms. The LoRa decoder may be also provided with information about the detected AoA or results of the power detection.

According to an example embodiment, the receiver may synchronize to a first, for example earliest, chirp waveform of the received signal or a portion of the received signal. The receiver may oversample the received signal with a sampling rate $R_{SS}$, where $R_{SS} \geq 2R_c$, where $R_c$ is the chirp rate of the chirp spread spectrum waveform(s) of the original signal. The signal may be therefore oversampled at a sampling frequency, which is at least twice the chirp rate of the signal. The oversampling may be performed per each transmitter in each symbol period. In other words, instead of the regular complex conjugate waveform with $M=2^{SF}$ MSK staircase, each staircase may be at least halved in both domains (time and frequency) in order to resemble a finer staircase. The receive signal may be oversampled with the sub-sample time-shifted matched filter.

Since chirp waveforms at the transmitter may be considered as M-FSK staircase waveforms (with $M=2^{SF}$) the shifting of the complex conjugate and unmodulated chirp waveform (down-chirp) at the receiver with a finer granularity than $2^{SF}$/BW enables to discriminate non-orthogonal waveforms since the sin x/x output of the matched filter will be also shifted. The oversampling with at least twice the $R_c$ sample rate per transmitter results in nulling of the received signal at zeros of the matched filter output. The receiver may therefore discriminate chirp spread spectrum waveforms from the received signal based on filtering the oversampled signal with the matched filter with different sub-sample shifts of the oversampled signal. Since it is unlikely that two transmitters would send their individual data, for example LoRa packets, at exactly integer multiples of $1/R_c$ (e.g. exact multiples of 8 µs for SF8 of 125 kHz LoRa waveforms), the oversampling method enables the receiver to detect deviation by a blurred matched filter output comprising a smaller peak and smaller ripples at each side of the reduced peak. The energy of the matched filter is therefore spread over time not resulting in a single sharp peak, as will be further described with reference to FIG. 10 and FIG. 12.

Referring back to FIG. 8, if the output of the FFT the matched filter is a single peak, the receiver may of determine that no overlapping of chirp waveforms with same spreading factor and (substantially) same bandwidth has occurred. Hence, the receiver may determine to apply a decoding method suitable for decoding chirp waveforms independently (cf. first decoding method).

However, if two or more peaks occur in the FFT of the matched filter output, the receiver may determine that overlapping of non-orthogonal waveforms with same spreading factor and same bandwidth has occurred. Hence, the receiver may apply another decoding method. In case of non-orthogonal waveforms, the waveform that is used for synchronization (first chirp waveform) may result in a single peak without significant side ripples at the output of the matched filter, while the second (and any other) waveform may not exactly match the sampling grid and thus the corresponding sin x/x response may have side-ripples and a reduced amplitude. The energy of the symbol may be therefore spread to the neighboring symbols. The effects caused by the deviation from the sample grid may be used to detect the non-orthogonal chirp waveforms.

According to an example embodiment, the receiver may use the received signal strength of each detected symbol carried by a chirp waveform to map the received non-orthogonal chirp waveforms, and hence the detected symbols, to different transmitters. This may be done since different transmitters (e.g. sensors, LoRa end-devices) may experience different pathloss, thus having different receive power levels at the receiver.

For example, two different power levels may be compared: amplitude of the peaks in the matched filter and sum power of the peaks plus neighboring n samples. Parameter n may be a configurable parameter. Value of parameter n may be set for example to half of the difference between two peaks in the FFT of the output of the matched filter. In the example of FIG. 8, the value of n may be set to 16. The receiver may therefore determine amplitudes of the peaks in the FFT of the output of the matched filter. Alternatively, or additionally, the receiver may determine, for each of the peaks, a sum of powers (or amplitudes) of samples within a predetermined distance (e.g. n) from a respective peak. The sum of the powers of the samples may therefore include the power of the peak sample.

According to an example embodiment, the receiver may use angle of arrival (AoA) to discriminate in azimuth signals received from different transmitters. The receiver may be for example equipped with a linear antenna array to enable AoA estimation. A one-dimensional antenna array may be used to estimate the (azimuthal) angle of arrival of the chirp waveforms coming from different directions. Accuracy of the AoA discrimination may however depend on the number of array elements. The number of array elements may be therefore selected based on the number of expected or installed transmitters within a range of the receiver. For example, a receiver may be configured with a first number of antenna elements for serving a first number of transmitters. Alternatively, the receiver may be configured with a second (higher) number of antenna elements for serving a second (higher) number of transmitters. This enables to optimize complexity and cost of the receiver for a particular deployment scenario.

Providing side information including the received signal strength and/or the AoA information to the decoder of the receiver improves simultaneous decoding of multiple non-orthogonal chirp waveforms. The decoder is thus better enabled to discriminate and decode for example multiple chirp waveforms using the same spreading factor and bandwidth and transmitted at least partially at the same time.

Figure 9:
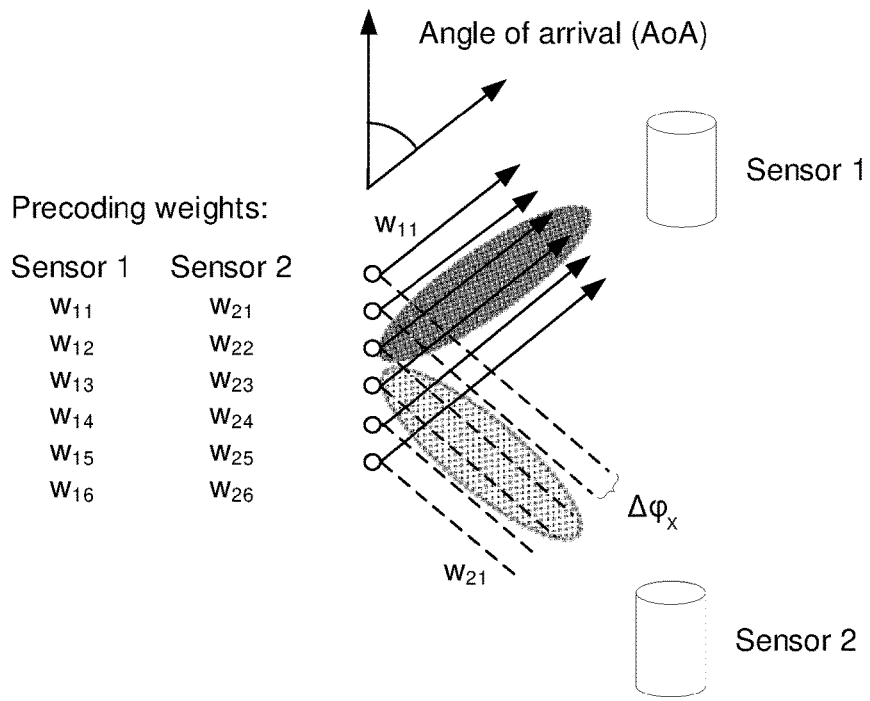
FIG. 9 illustrates an example of estimation of an angle of arrival (AoA) by beamformers, according to an example embodiment.

FIG. 9 illustrates an example of estimation of an angle of arrival (AoA) by beamformers, according to an example embodiment. Beamforming as well as angle of arrival estimation may be performed at the receiver by applying suitable weight vectors $w_{ix}$, where x is a weight index and i is a sensor index, to the receive antennas. This enables constructive combination of the received signals from different antenna elements so that the far field generates a strong beam into the azimuthal direction of the sensor position. A far field assumption $B(\theta)=\|\Sigma w1x\Delta\varphi x\|_2^2$ may be applied $\Delta\varphi_x$ is the phase difference for the antenna element x due to the beam direction ($\theta$) of Sensor 1 (or Sensor 2). Note that this example is provided for a line of sight (LOS) scenario and for two sensors, where Sensor 1 and Sensor 2 are served by the beams illustrated with solid and dashed arrows, respectively.

The AoA may be estimated in a first step, for example at the beginning of the data transmission, to be the beam direction that maximizes the received signal strength. Since different sensors may have different angles of arrival, the receiver may discriminate multiple beamformed signals from the received signal based on an angle of arrival. Non-orthogonal chirp waveforms corresponding to the different beamformed signals may be then mapped to corresponding sensors based on stored reference data including a reference AoA for each sensor.

Figure 10:
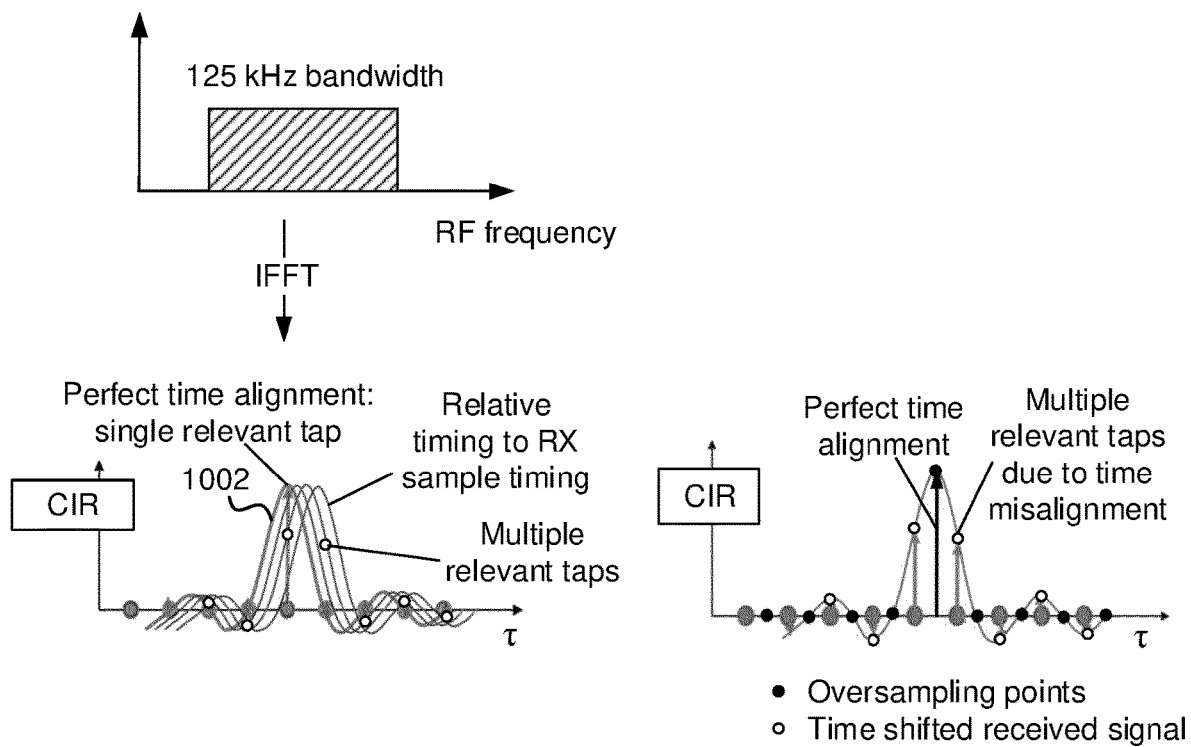
FIG. 10 illustrates an example of oversampling bandwidth-limited signals, according to an example embodiment.

FIG. 10 illustrates an example of oversampling bandwidth-limited signals, according to an example embodiment. The limited receive RF bandwidth, for example 125 kHz, leads due to the IFFT operation to a convolution of samples with the SI-function SI=sin x/x (sinc function) in the time domain ($\tau$). This is because the limited bandwidth corresponds to rectangular filtering in frequency domain, which corresponds to filtering by the SI function in the time domain. Examples of SI-functions as the channel impulse response (CIR) are illustrated in FIG. 10.

Generally, the received signal may not be time-aligned with the sample timing of the receiver. Therefore, the receiver may perform time synchronization, for example by a frame alignment algorithm, to align the receiver sampling grid to for example to a first signal received from a first sensor (FIG. 10, bottom left). The frame alignment algorithm may shift the sample timing, corresponding to the different illustrated SI-functions, until the sample timing fits the received signal. With a perfect time alignment, the SI-function 1002 has one strong peak signal, while the other taps of that SI-function (i.e. samples) are zero. Such perfect (or near-perfect) time alignment may be achieved for the first sensor signal, while any further signals, for example a second signal received from a second sensor, may have a certain time mismatch, as illustrated in FIG. 10 (bottom right). Correspondingly, the second sensor smears the signal power over multiple taps and the peak tap has a reduced amplitude. To better reconstruct the SI shape for multiple input sensor signals, the received signals may be oversampled, leading to the samples illustrated with white and black circles. The oversampling and time shifting detects the "off-grid" positions of the taps, i.e., the taps that are not coinciding with the nulls of the SI function. For perfect time alignment, the zeros of the SI-function fall together with the zeros of the sample taps and without oversampling there may be only one strong tap at the peak of the SI-function. In contrast, when there is a relative time shift, then one SI-function generates at all sample taps amplitudes greater than zero. Based on knowledge of the shape of the SI-function (given by the receiver bandwidth), it is possible to identify the relative time offsets for all received SI-functions. This enables to distinguish received sensor signals by their different shapes, as will be further discussed with reference to FIG. 12.

Figure 11:
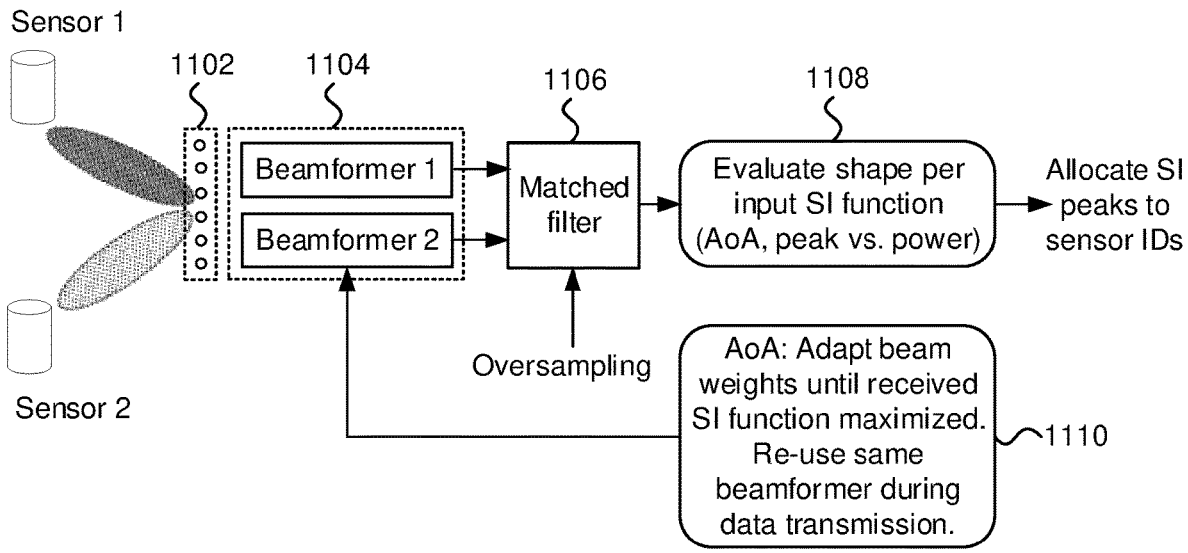
FIG. 11 illustrates an example of a block diagram of a receiver with a beamformer for each sensor and an oversampled matched filter to discriminate overlapping waveforms, according to an example embodiment.

FIG. 11 illustrates an example of a block diagram of a receiver with a beamformer for each sensor and an oversampled matched filter to discriminate non-orthogonal waveforms, according to an example embodiment. Sensors 1 and 2 are provided as examples of transmitters. The receiver may comprise a plurality of beamformers 1104 coupled to an antenna array 1102. One beamformer may be assigned to one sensor. The beamformers 1104 may be controlled by block 1110, which may be also configured to detect AoA for each of the sensors. For example, weights associated with different elements of the antenna array 1102 may be adapted until the received SI function is maximized for a particular sensor. Block 1110 may for example determine weights that maximize, or provide a sufficiently high value, of the ratio between the highest peak of the SI function and the remaining samples of the SI function for each sensor. This may be done during an initialization phase, for example before initiating communication with a particular sensor. The same beamformer, e.g. the same set of weights, may be used during data transmission from the particular sensor.

The outputs of the beamformers 1104 may be provided to the matched filter 1106. The matched filter 1106 may receive as input each beamformed signal separately. For example, the matched filter 1004 may be applied to a first beamformer or AoA estimator and then applied again to a second beamformer or AoA estimator. The matched filter may be oversampled with a sampling rate $R_{SS} \geq 2R_c$, in order to detect the relative SI shapes by different sub-sample shifting per transmitter. The shape of the input SI functions may be then evaluated at block 1108, which may provide as an output the allocation of the SI peaks to the different sensors. The receiver of FIG. 11 distinguishes between two or more sensors based on the sensor specific AoA, peak. vs. power, as well as the relative time offset to the sample timing. In the example of FIG. 11, the receiver applies two beamformers properly adapted to the AoA of each of the two sensors and evaluates the SI shape of the received sensor signals.

Figure 12:
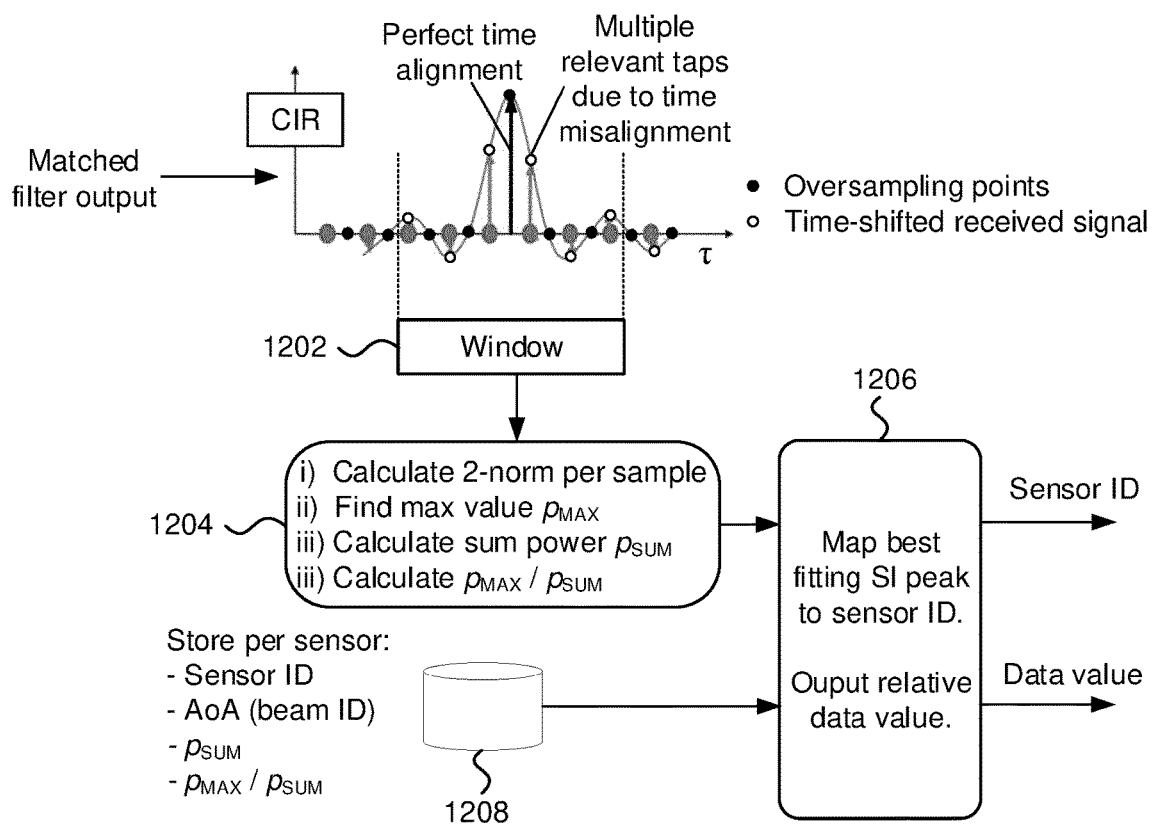
FIG. 12 illustrates an example of a block diagram of a receiver for discriminating overlapping chirp waveforms based on a window over matched filter output samples, according to an example embodiment.

FIG. 12 illustrates an example of a block diagram of a receiver for discriminating non-orthogonal chirp waveforms based on a window of matched filter output samples, according to an example embodiment. The example embodiments of FIG. 12 may be for example applied to evaluate the shape of the matched filter output at block 1108 of FIG. 11. Again, perfect time alignment results in a strong single peak in the matched filter output. And, misalignment causes multiple relevant taps to appear. The oversampling points have been illustrated by black dots and the white dots represent a time-shifted signal.

At block 1202, the receiver may apply a window on the samples of the output of the matched filter 1106. The length of the window may be a design parameter. The window may for example cover two or more sidelobes around the peak of the SI-function. The window may for example comprise a fraction, for example approximately 10% of the sequence length, for example the length of the sequence of samples of a chirp. The window length may be for example 10 to 100 sample points. The receiver may then calculate the amplitude or the two-norm (i.e. Euclidian norm) per received sample for each or at least two received SI signal resulting from the different sub-sample shifting of the received signal. Based on these amplitude or power values, the receiver may determine the time domain sample with the maximum peak power as well as the power of the residual other time domain samples. In case of perfect time alignment, the normalized peak power may be equal to one and the other samples may be zero or with oversampling follow the SI shape. For the time-shifted received signal, the normalized peak amplitude may be lower and the residual power of the other samples may be higher. This may be exploited to map the received signals to correct sensors.

According to an example embodiment, the receiver may detect multiple chirp waveforms in the output of the matched filter. At block 1204, the receiver may calculate, for at least two (or each) of the received chirp waveforms, a peak sample power within the window of samples applied at block 1202. The peak sample power may for example calculated by calculating a 2-norm per each sample of the window and finding a maximum value of the two-norm ($p_{MAX}$) within the window. Instead of the 2-norm, also any other measure indicative of the strength of a sample may be considered as an indication of the power of the sample. Alternatively, or additionally, the receiver may also calculate a power of the window of received samples $p_{SUM}$, for example based on the sum of the 2-norms per each sample of the window. The receiver may also calculate a ratio between the peak sample power and the power of the window of samples, $p_{MAX}/p_{SUM}$.

To enable allocation of received waveforms to sensor devices, reference data may be stored at the receiver for each of the sensors. The reference data may comprise reference values for at least one of the above characteristics, for example a reference peak sample power within the window of samples, a reference power of the window of samples, or a reference ratio between the peak power and the power of the window of samples. Such characteristics may be estimated for example at the beginning of the data transmission from a particular sensor and stored in a storage device 1208 of the receiver, which may for example comprise the at least one memory 304. The reference data may be sensor specific. The reference data may further comprise AoA estimation or a beam identifier for each sensor.

The receiver may compute current values for the above characteristics per chirp waveform, for example in response to detecting non-orthogonal chirp waveforms. The receiver may further compare and match the computed values to the best fitting values of the reference data retrieved from the storage device 1208. The storage device 1208 may also store a sensor identifier (ID) associated with corresponding reference data, which enables the receiver to map the received chirp waveforms and their data values to the corresponding sensors, at block 1206. The receiver may provide as outputs of block 1206 the sensor identifier and the data value decoded based on a corresponding chirp waveform.

In general, the receiver may map peaks of the output of the matched filter to a plurality of transmitters. The receiver may map the peaks of the output of the matched filter to the transmitters based on comparison of the peak sample power, the power of the window of samples, and/or the ratio between the peak sample power and the power of the window of samples, to stored reference data associated with the transmitters. The receiver may further output the data values associated with the transmitters. Mapping the received chirp waveforms to corresponding transmitters may be based on a combination of at least two of the AoA estimation, the power characteristics, or the shape of the output of the matched filter. Reliability of estimating the correct transmitter for each non-orthogonal chirp waveform may be improved by using any combination of the example embodiments disclosed herein.

Figure 13:
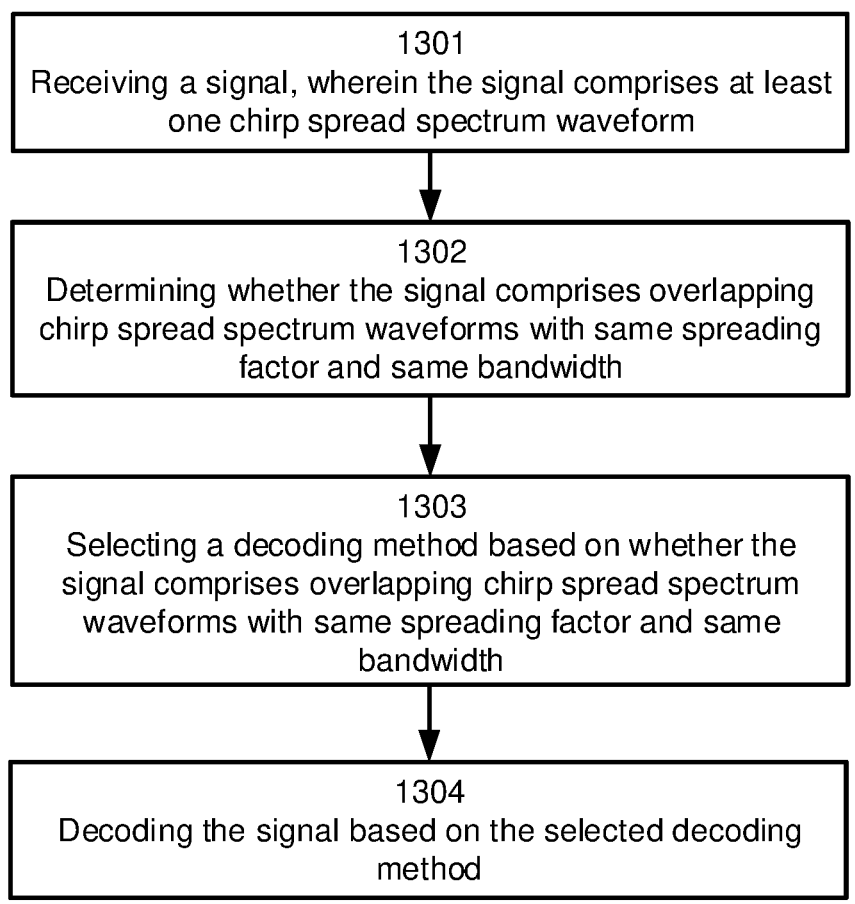
FIG. 13 illustrates an example of a block diagram for receiving chirp waveforms according to an example embodiment.

FIG. 13 illustrates an example of a method 1300 for receiving chirp waveforms, according to an example embodiment.

At 1301, the method may comprise receiving a signal, wherein the signal comprises at least one chirp spread spectrum waveform. At 1302, the method may comprise determining whether the signal comprises overlapping chirp spread spectrum waveforms with same spreading factor and same bandwidth.

At 1303, the method may comprise selecting a decoding method based on whether the signal comprises overlapping chirp spread spectrum waveforms with same spreading factor and same bandwidth.

At 1304, the method may the method may comprise decoding the signal based on the selected decoding method.

Further features of the method directly result for example from functionalities of a receiver, for example base station 120, or any other device, as described throughout the specification and in the appended claims, and are therefore not repeated here. Different variations of the methods may be also applied, as described in connection with the various example embodiments.

An apparatus, for example a receiver such as base station 120, or any other device, may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:
1. An apparatus, comprising:
at least one processor; and
at least one memory storing instructions that, when executed with the at least one processor, cause the apparatus to perform:
receiving a signal, wherein the signal comprises at least one chirp spread spectrum waveform;
determining whether the signal comprises overlapping chirp spread spectrum waveforms with same spreading factor and same bandwidth;
selecting a decoding method based on whether the signal comprises the overlapping chirp spread spectrum waveforms with the same spreading factor and the same bandwidth; and
decoding the signal based on the selected decoding method.

2. The apparatus according to claim 1, wherein the instructions, when executed with the at least one processor, cause the apparatus to further perform:
filtering the signal with an oversampled matched filter; and
determining whether the signal comprises the overlapping chirp spread spectrum waveforms with the same spreading factor and the same bandwidth based on a number of peaks in a fast Fourier transform of the output of the matched filter.

3. The apparatus according to claim 2, wherein the instructions, when executed with the at least one processor, cause the apparatus to further perform:
synchronizing to a first chirp spread spectrum waveform of the signal;
oversampling the signal at an oversampling rate $R_{SS}$, wherein $R_{SS} \geq 2R_c$, wherein $R_c$ is a chirp rate of the at least one chirp spread spectrum waveform;
discriminating a plurality of chirp spread spectrum waveforms from the signal based on filtering the oversampled signal with the matched filter with different sub-sample shifts of the oversampled signal;
mapping outputs of the matched filter corresponding to the different sub-sample shifts of the oversampled signal to a plurality of transmitters;
determining data values associated with the plurality of transmitters based on the outputs of the oversampled matched filter corresponding to the different sub-sample shifts; and
outputting the data values associated with the plurality of transmitters.

4. The apparatus according to claim 3, wherein the instructions, when executed with the at least one processor, cause the apparatus to further perform:
calculating, for at least two of the plurality of chirp spread spectrum waveforms, at least one of:
a peak sample power within a window of samples of the output of the matched filter,
a power of the window of samples, or
a ratio between the peak sample power and the power of the window of samples; and
mapping the plurality of peaks of the output of the matched filter to the plurality of transmitters based on comparison of at least one of the peak sample power, the power of the window of samples, or the ratio between the peak sample power and the power of the window of samples, to stored reference data associated with the plurality of transmitters.

5. The apparatus according to claim 4, wherein the instructions, when executed with the at least one processor, cause the apparatus to further perform:
at least one of determining amplitudes of a plurality of peaks in a fast Fourier transform of the output of the matched filter or determining, for at least two of the plurality of peaks, a sum of a power of a plurality of samples within a predetermined distance from a respective peak; and
mapping the plurality of chirp spread spectrum waveforms to the plurality of transmitters further based on comparison of the amplitudes of the plurality of peaks or the sum of the power of the plurality of samples around the respective peaks to the stored reference data associated with the plurality of transmitters.

6. The apparatus according to claim 3, wherein the instructions, when executed with the at least one processor, cause the apparatus to further perform:
discriminating the plurality of chirp spread spectrum waveforms from the signal further based on an angle of arrival; and
mapping the plurality of chirp spread spectrum waveforms to the plurality of transmitters further based on comparison of the angle of arrival to the stored reference data associated with the plurality of transmitters.

7. A method, comprising:
receiving a signal, wherein the signal comprises at least one chirp spread spectrum waveform;
determining whether the signal comprises overlapping chirp spread spectrum waveforms with same spreading factor and same bandwidth;
selecting a decoding method based on whether the signal comprises the overlapping chirp spread spectrum waveforms with the same spreading factor and the same bandwidth; and
decoding the signal based on the selected decoding method.

8. The method according to claim 7, further comprising:
filtering the signal with an oversampled matched filter; and
determining whether the signal comprises the overlapping chirp spread spectrum waveforms with the same spreading factor and the same bandwidth based on a number of peaks in a fast Fourier transform of the output of the matched filter.

9. The method according to claim 8, further comprising:
synchronizing to a first chirp spread spectrum waveform of the signal;
oversampling the signal at a sampling rate $R_{SS}$, Wherein $R_{SS} \geq 2R_c$, wherein $R_c$ is a chirp rate of the at least one chirp spread spectrum waveform;
discriminating a plurality of chirp spread spectrum waveforms from the receive signal based on filtering the oversampled receive signal with the matched filter with different sub-sample shifts;
mapping outputs of the matched filter corresponding to the different sub-sample shifts of the oversampled receive signal to a plurality of transmitters;
determining data values associated with the plurality of transmitters based on the outputs of the matched filter corresponding to the different sub-sample shifts; and
outputting the data values associated with the plurality of transmitters.

10. The method according to claim 9, further comprising:
calculating, for at least two of the plurality of chirp spread spectrum waveforms, at least one of:
- a peak sample power within a window of samples of the output of the matched filter,
- a power of the window of samples, or
- a ratio between the peak sample power and the power of the window of samples; and mapping the plurality of peaks of the output of the matched filter to the plurality of transmitters based on comparison of at least one of the peak sample power, the power of the window of samples, or the ratio between the peak sample power and the power of the window of samples, to stored reference data associated with the plurality of transmitters.

11. The method according to claim 10, further comprising:
determining amplitudes of a plurality of peaks in a fast Fourier transform of the output of the matched filter or determining, for at least two of the plurality of peaks, a sum of a power of a plurality of samples within a predetermined distance from a respective peak; and
mapping the plurality of chirp spread spectrum waveforms to the plurality of transmitters further based on comparison of the amplitudes of the plurality of peaks or the sum of the power of the plurality of samples around the respective peaks to the stored reference data associated with the plurality of transmitters.

12. The method according to claim 9, further comprising:
discriminating the plurality of chirp spread spectrum waveform from the signal further based on an estimated angle of arrival; and
mapping the plurality of chirp spread spectrum waveforms to the plurality of transmitters further based on comparison of the estimated angle of arrival to the stored reference data associated with the plurality of transmitters.

13. A non-transitory program storage device readable with an apparatus, tangibly embodying a program of instructions executable with the apparatus to perform at least the following:
receiving a signal, wherein the signal comprises at least one chirp spread spectrum waveform;
determining whether the signal comprises overlapping chirp spread spectrum waveforms with same spreading factor and same bandwidth;
selecting a decoding method based on whether the signal comprises the overlapping chirp spread spectrum waveforms with the same spreading factor and the same bandwidth; and
decoding the signal based on the selected decoding method.

* * * * *